Figure 7:
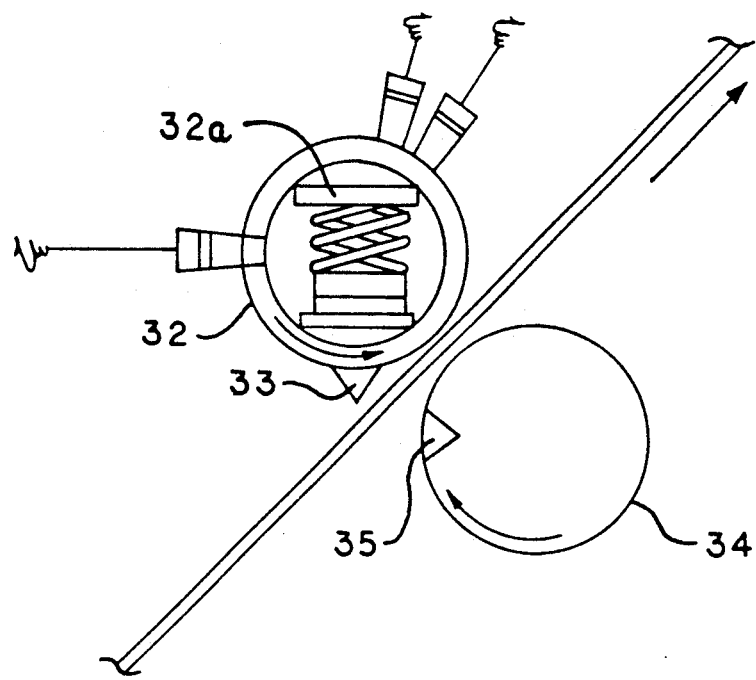

United States Patent [19]

Townsend

[11] Patent Number: 5,076,498
[45] Date of Patent: Dec. 31, 1991

[54] IRRIGATION TAPE AND METHOD OF PRODUCING SAME

[75] Inventor: James D. Townsend, Dry Creek, Australia

[73] Assignee: Townsend Controls Pty. Ltd., Australia

[21] Appl. No.: 372,354

[22] PCT Filed: Oct. 7, 1988

[86] PCT No.: PCT/AU88/00391
§ 371 Date: Jun. 9, 1989
§ 102(e) Date: Jun. 9, 1989

[87] PCT Pub. No.: WO89/03172
PCT Pub. Date: Apr. 20, 1989

[30] Foreign Application Priority Data

Oct. 9, 1987 [AU] Australia .................. PI4794
Oct. 19, 1987 [AU] Australia .................. PI4939
Oct. 19, 1987 [AU] Australia .................. PI4940
Oct. 19, 1987 [AU] Australia .................. PI4941
Oct. 19, 1987 [AU] Australia .................. PI4942

[51] Int. Cl.⁵ .................................... B05B 15/00
[52] U.S. Cl. .................... 239/542; 138/42; 156/285; 264/511
[58] Field of Search .......... 239/542; 138/42; 264/511; 156/285, 567

[56] References Cited

U.S. PATENT DOCUMENTS

| 3,126,580 | 3/1964 | Paschke | 264/511 |
| 3,895,087 | 7/1975 | Ottinger et al. | 264/511 |
| 4,175,882 | 11/1979 | Gilead | 239/542 |
| 4,177,102 | 12/1979 | Tokuno | 156/285 |
| 4,195,784 | 4/1980 | Gilead | 239/542 |
| 4,473,191 | 9/1984 | Chapin | 239/542 |
| 4,548,360 | 10/1985 | Delmer | 239/542 |
| 4,657,625 | 4/1987 | Kawakami | 264/511 |
| 4,722,759 | 2/1988 | Roberts et al. | 239/542 |
| 4,731,138 | 3/1988 | Lupke | 156/285 |

FOREIGN PATENT DOCUMENTS 0026030 12/1978 Australia .
0040406 4/1980 Australia .
0033361 3/1985 Australia .

Primary Examiner—Andres Kashnikow
Assistant Examiner—Michael J. Forman
Attorney, Agent, or Firm—Oldham & Oldham Co.

[57] ABSTRACT

A drip irrigation tape and a method and apparatus for manufacture of same in which there are foils of thermoplastics material formed and sealed to produce a main waterway extending along the tape, and a series of tortuous flow restricting channels which are formed in a further foil by forming these in a channel shape mould on a drum, each channel communicating at one position with the waterway and having an outlet at another position to give a drip feed from each channel, the invention further including using an extrusion of thermoplastics foil directly from an extruding machine into such a forming machine, effecting an aperture from the tortuous channel to the main waterway by using a heated finger, effecting an outlet from the tortuous channel by providing an offset channel part which can then be nicked with a hot blade, and effecting an improved sealing together by using spaced apart dimples in providing joining fusing pressure.

18 Claims, 8 Drawing Sheets

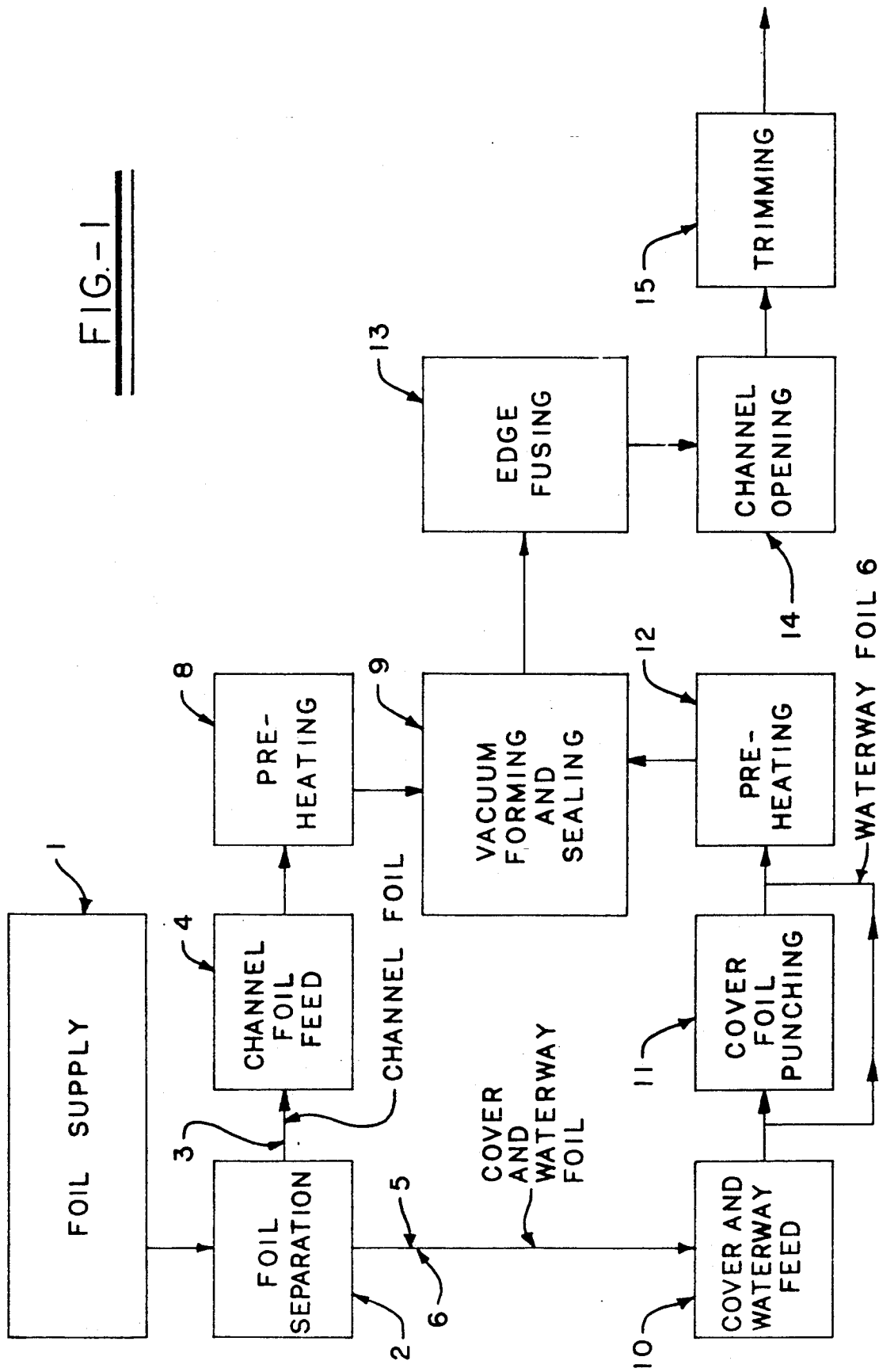

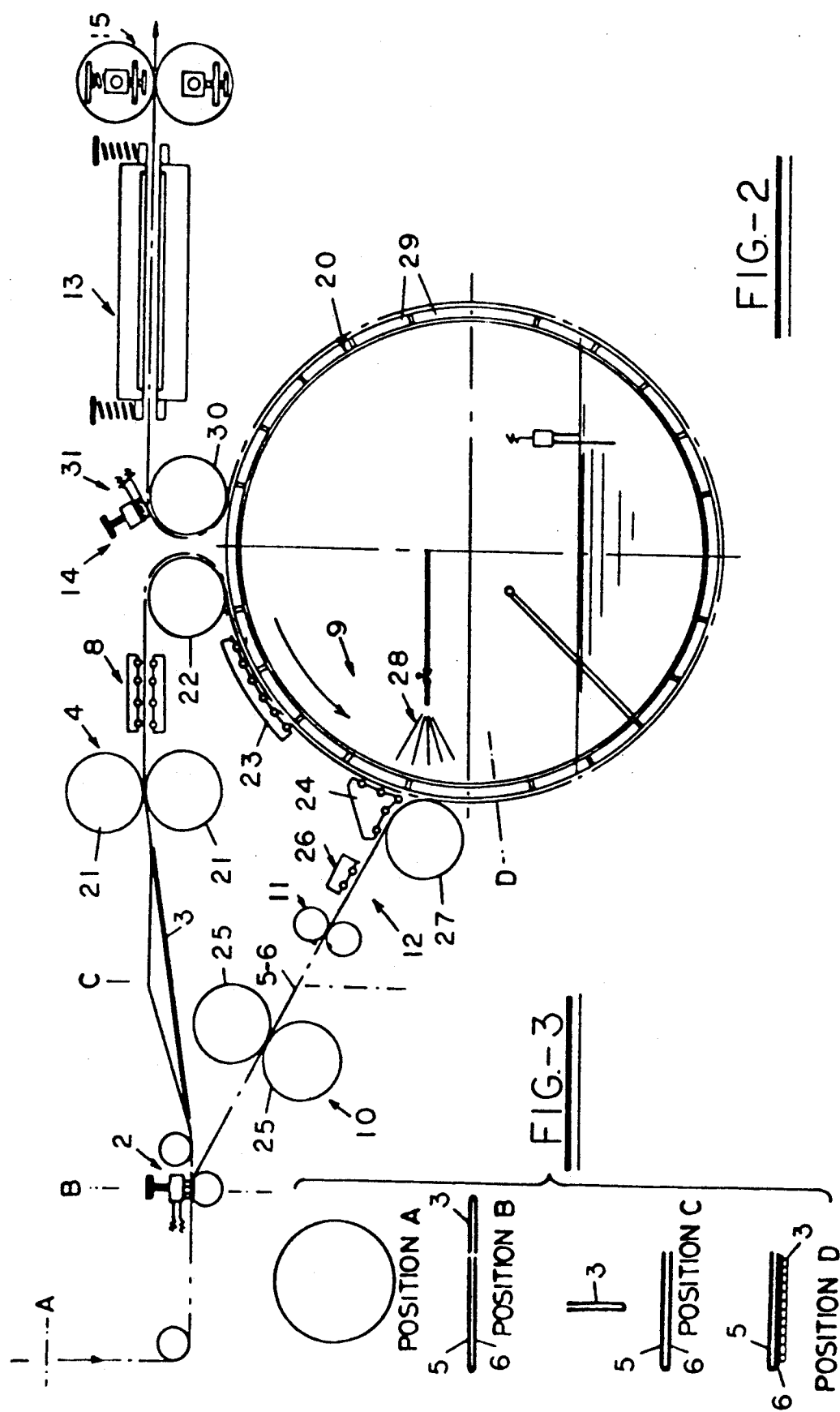

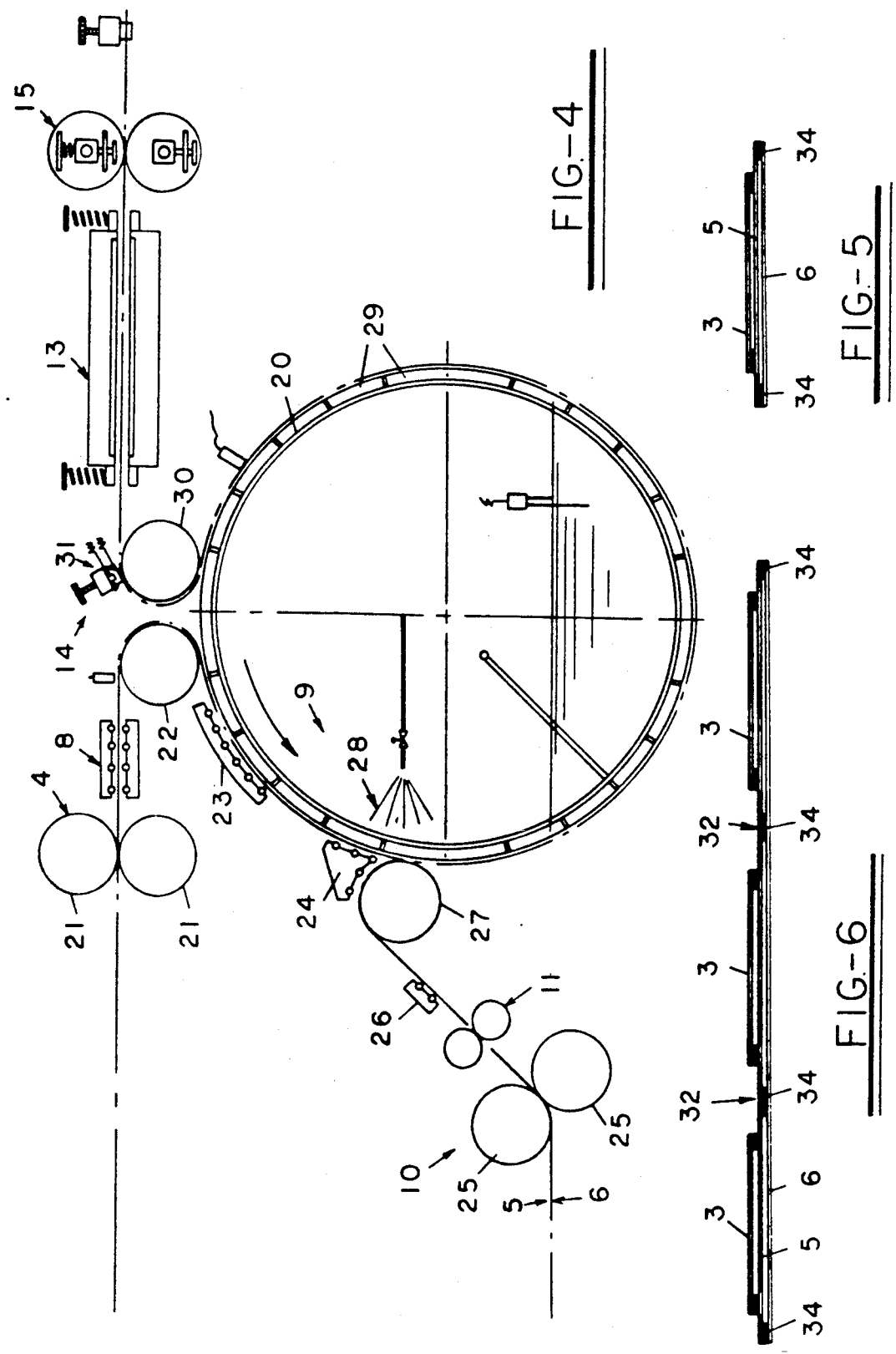

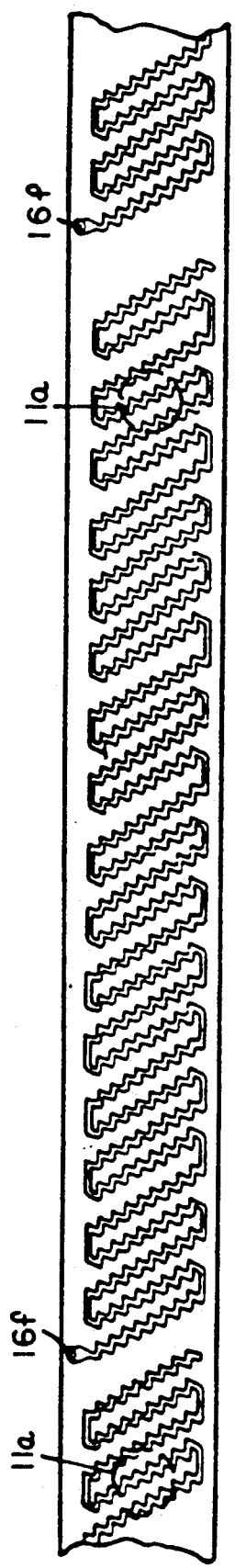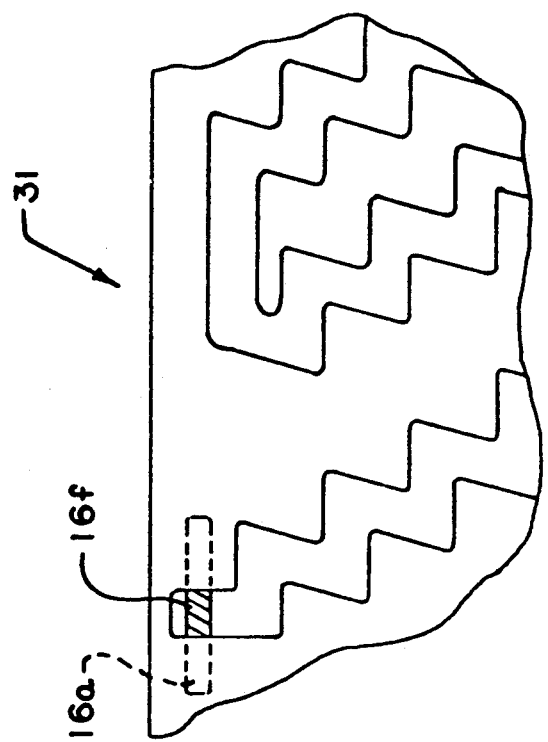
FIG-10
FIG-11

IRRIGATION TAPE AND METHOD OF PRODUCING SAME

This invention relates to an irrigation tape of the general type in which an elongated tape is provided with a waterway which extends longitudinally along the tape and communicates with a series of flow restrictor channels of tortuous form, at least one of each channels having an inlet to the waterway and at least an outlet being provided from each channel remote from the inlet to allow the outflow through the tortuous channel.

This general type of irrigation tape is already known, and for instance in Australian Patent No. 516,536 (29122/77) and corresponding U.S. Pat. No. 4,195,784 in the name of Gideon Gilead is shown a tape formed by superimposing three foils and marginally dividing together the foils, a water channel being provided between two of the foils while between one of these foils and a third foil is formed the series of flow restricted channels which have communication with the flow channel and with the atmosphere, the inlet and outlet points being displaced in relation to each other along the flow control channel.

A similar Gilead specification is U.S. Pat. No. 4,175,882 filed Dec. 29, 1976, but containing more restricted claims than in the Australian counterpart.

Similarly the complete specification of Australian Patent Application No. 34599/76 in the name of Jaime Sahagun-Barragan shows a further form of such tape and relates particularly to a specific form of tortuous part whereby the flow rate is broken down to allow the tape to act as a trickle feed of water to an area from the waterway of the tape.

The referred to prior art documents are distinguished principally by the position of the marginal joins of the foils which form the tape.

The specification of U.S. Pat. No. 4,548,360, May 22, 1984, in the name of Daniel W. C. Delmer uses a single foil doubled back to form a supply tube and overlapped to form a bleed channel between overlapped edges of the foil, but the bleed channels results from the overlap.

A recently filed specification by Townsend Controls Pty. Ltd., Australian Patent Application No. 33361/84, published Mar. 28, 1985, also relates to this type of irrigation tape but relates principally to a particular pattern of the flow restrictor channel and the method by which the channels are produced.

In this form a single foil is twice overlapped to form a water channel on one side of a medial portion, a tortuous channel being formed on the other side by embossing.

It is and object of this invention to provide a continuous irrigation tape which is simple to construct and does not require precision laying of adhesives or other connecting elements between the forming foils.

It is a further object to provide a simple and effective method of forming such a tape.

Other objects will be apparent from the following description.

The drip irrigation tape according to the invention is formed from one or more foils, formed from thermoplastic material and sealed to produce a main waterway extending along the tape, and a series of tortuous flow restricting channels formed in a portion of the foil which co-operates with another portion of the foil to close the channels, each channel communicating at one position with the main waterway and having an outlet at another position to give a drip feed from each channel to an area to be watered.

While the construction can use one or more foils marginally fused together, the preferred method uses a tubular foil or individual sections which can be extruded directly to the tape forming machine where it is shaped and manipulated to provide overlapping sections with two sections forming the wall of the waterway and another section carrying the flow restricted channels, this section being fused to one wall section.

Features of the invention include a method of folding the vacuum forming means for the flow restricting channels, also the temperatures controls for fusing, as well as heat flow control, cutting of apertures in the foils, cutting or nicking an outlet in the restricted channels, controlling the distance between inlet and outlet of each of the restricted channels, and achieving better bonding.

In its finished form the tape of this invention comprises a foil section comprised of a thermo-plastics material which is vacuum formed to provide a series of tortuous channels which are closed on one side of the foil section by a cover foil section fused to the first foil section at all meeting areas other than over the channels, ingress of water to the channels being by a punched aperture for each tortuous channel through the central foil section leading to a waterway, and an outlet for each tortuous channel formed by opening a portion of each channel by a cutting away of the vacuum formed channel to allow outflow from the tape, the waterway being formed by a section of foil which extends over the section of the cover foil which closes the channels and has its edges marginally fused to the cover foil.

The foil sections which are used can be provided from a tubular extrusion which can be fed directly into a host-forming portion of the machine, and can be cut, folded, manipulated and otherwise directed to form the various necessary foil sections and be rejoined to produce the tape, but the foils can be independently supplied if this is found desirable, such as by simultaneously extruding the sections and feeding into the tape-forming machine, the machine comprising means whereby the sections of the foil can be moved forward in the required manner while one foil section at least is vacuum formed to produce channels and another foil section is joined thereto to close the channels, a third section being joined to the channel-closing section to form a waterway leading to the channels through apertures extending from the waterway into the channels, apertures being formed at outer parts of the channel to allow slow out-flow for irrigation purposes.

One of the further difficulties relates to punching the aperture for each tortuous channel through the central foil.

The problem in using a simple punch is that this becomes blunted where it is used on a continuing basis and this is therefore simply not a viable solution.

A further feature of this invention therefore is to propose a method of effecting such an aperture through a sheet of thermo-plastics material which includes pushing against the sheet, a finger, an outermost end of which at least is heated to a temperature which is in excess of the melting temperature of the plastics material.

In preference the shape of the finger is conical with the apex of the cone farthermost from the base adapted to engage against the sheet of the plastic and in preference there is a co-operating aperture coincidentally located on the other side of the sheet which matches the diameter at tis base of the cone shape of the finger.

In preference the conical shape of the finger is such that the apex is subtended by an approximate angle of 90°.

In preference, the temperature to which the finger is raised is such that while being above the melting temperature of the plastics material, the temperature will be such that it will effect a reasonably rapid melting and therefore allowing a retraction of the plastic surrounding the point of entry by reason of such first piercing and subsequent heating.

In preference, the finger and the co-operating aperture are supported by parallel rollers between which the foil comprised of the thermo-plastics material passes and there are activating means causing the respective rollers to rotate causing coincident motion effecting a piercing which is co-ordinated with a relative location of a vacuum forming drum.

One of the next problems relates to cutting an aperture as an outlet for each tortuous channel.

A number of different techniques have been tried over the years but it has become clear that these are either too expensive causing inefficient manufacturing operations or they do not provide on a continuing basis a reliable opening as an outlet.

According to a further preferred feature then there is provided that for each tortuous channel, there is an outlet part which is offset to a side as compared to a remaining part of a respective tortuous channel and there are means comprising a heated blade fixedly located so as to ensnare such offset part of the tortuous channel solely, as the tortuous channel passes a nicking station.

In preference, the nicking station includes a blade having a broad face, and the temperature being held above a melting point of the thermo-plastics material so that the effect can be to push the plastics material away from a then effected aperture which is adapted to act as an outlet for a respective channel.

Such an arrangement overcomes a further problem in which there might be a channel part raised higher than that providing the remaining tortuous path, the difficulty here being that when the tape is subsequently folded for storage purposes, the effect will be to compress some of the remaining thermo-plastics material on the outlet part hence causing this to unnecessarily close and destroying the effect.

By in fact having the outlet to a side, surrounding tape is to a very large extent held separate from the outlet by the remaining channel part of the tape.

A further problem that has been found to occur relates to achieving a joining together of two thermo-plastics sheets in such a way that there will be effected a substantially strong bond sufficient to withhold under significant irrigation pressures and to achieve this simply by effecting a first surface melting of the plastics material and then forcing these together.

Our experience hitherto has been that this has been very difficult to achieve.

While at first it might appear to be simple in practice, it was found that despite significant melting and significant pressures, there tended to be very large areas beneath the surface which had not adhered and there seemed to be no consistency in establishing why some parts were welding and others were not.

After substantial experimentation, it has been discovered that effective adhesion can be achieved if there are provided distributed points of significantly higher pressure during the bringing together of the two sheets to be adhered.

In a simple way, this required providing a so-called dimpled or knurled roller to effect the application of pressure with the distribution of pressure points being sufficiently small so as not to cause difficulty with the application but nonetheless adequately dispersed for the purposes.

The reason for this being effective is not entirely clear but it is suspected that with applying distributed pressure points, this leaves valleys between the pressure points in which vapor can gather which would otherwise be encaptured between a broader sheet face, and furthermore, there would tend to be a more concentrated transfer of heat through the actual transfer point leading to a greater local heating without losing total integrity of the tape.

It is finally to be noted in the stated manufacture of tape of this type using thermo-plastics material, that the tape itself while being heated nonetheless is also so used to support itself between rollers.

The effect therefore of heating on such a tape has to be such that while there would be caused a surface heating, the tape will not have been heated to the extent that all the tape will have reached a melt temperature before it is either fully supported by other means or cooled appropriately.

In order however that the invention may be more fully appreciated, some embodiments thereof will not be described with reference to the accompanying drawings which are of a diagrammatic nature only and intended to give a general idea of the embodiments of the invention but are not be taken as limiting the invention to the embodiments shown.

Figure 8:
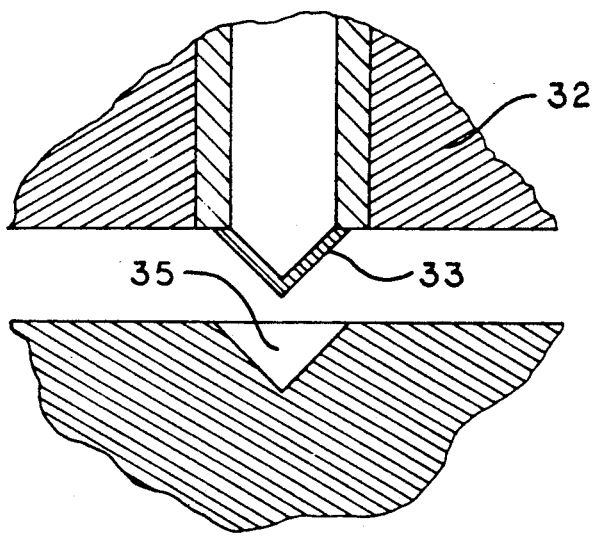
Figure 9:
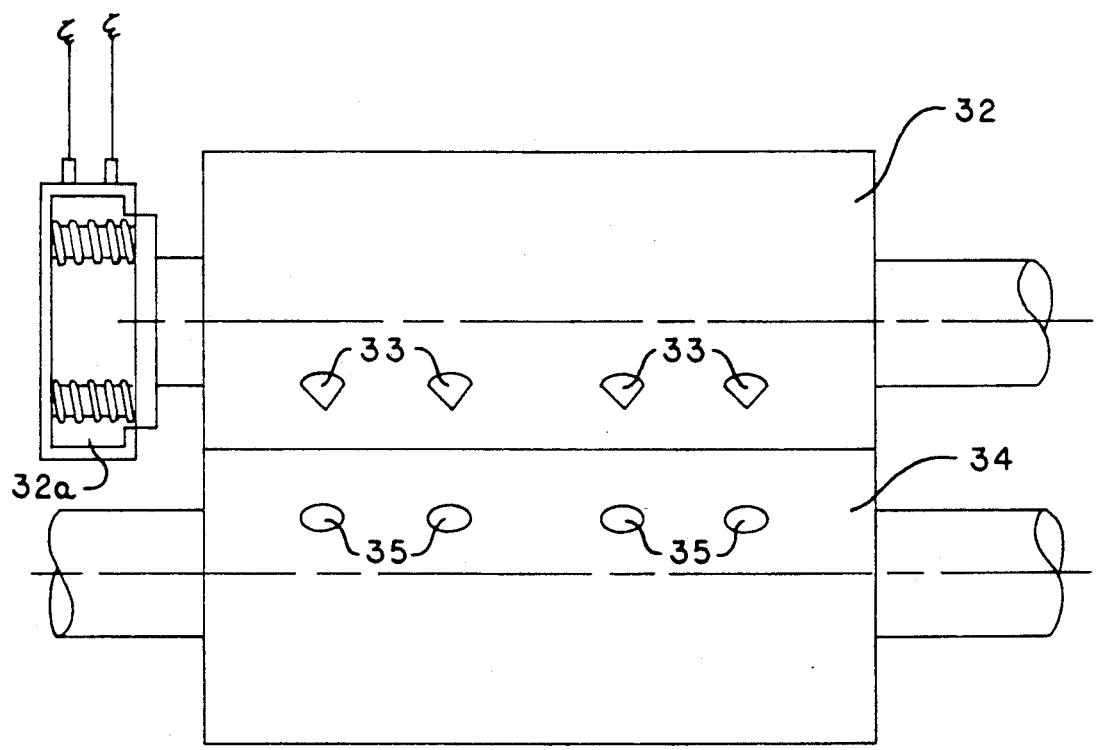
Figure 12:
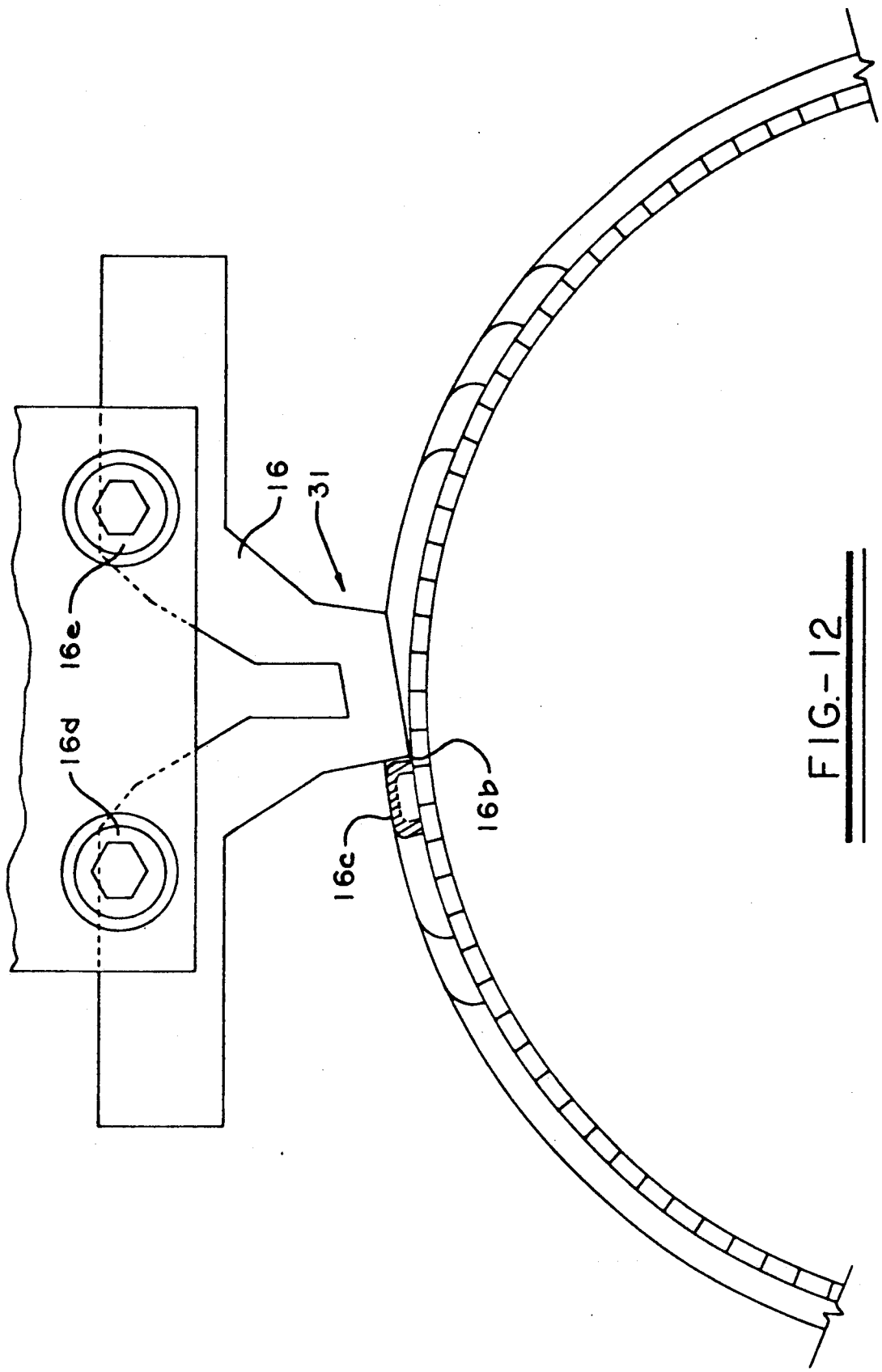
Figure 13:
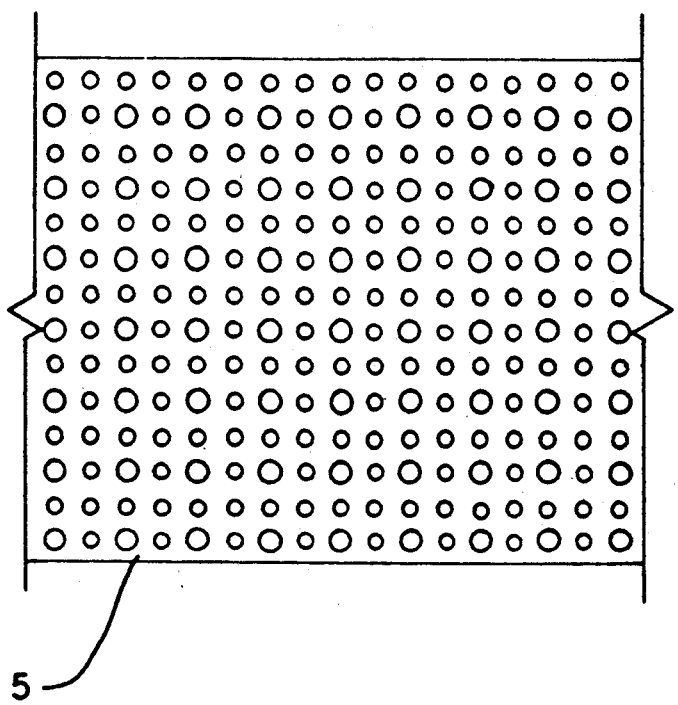

In the drawings:

FIG. 1 is a schematic block diagram to show the stages by which the irrigation tape is formed and the method of production, FIG. 2 is a schematic view of the machine which forms the tape from a tube of plastic material which may be produced and processed by the machine the subject of this invention, FIG. 3 shows diagrammatically stages in the production of the tape from a tube of plastics material, FIG. 4 is a view similar to FIG. 2 but showing the tape produced from flat foil sections, FIG. 5 shows schematically the final assembly of the foil sections in the completed tape, and FIG. 6 shows how multiple tapes can be simultaneously formed and the foil then split to form a plurality of tapes, FIG. 7 is a schematic view of the arrangement by which punched apertures can be effected and how these can be caused to cut in co-ordination with the position of a main vacuum drum, FIG. 8 is a detail of the projecting finger and appropriate receiving aperture, FIG. 9 is a view from an end showing two rollers in parallel and providing for four apertures to be cut in line across the width of the tape if this is the type of tape to be used, FIG. 10 is a plan view of a section of tape thus formed showing in dotted outline an inlet aperture through a central foil section and there being indicated a general useful range of positions over which the aperture can be located, also showing outlets offset to one side of the remaining channel and showing in dotted outline the position of a cutting tool which can be left in a fixed position and which will effect a nicking of such a channel part casing an outlet, FIG. 11 is an enlargement of an outlet part of such a view as in FIG. 10, FIG. 12 is a side view of the nicking blade including its shape and position relative to the channel on the tape as it is passing over a roller, and FIG. 13 illustrates the manner in which the foil section is caused to be dimpled as it is brought in contact after substantial melting of a cover foil section as it is caused to be pressed against the foil section carrying the plurality of vacuum formed channels.

Referring to the drawing shown in FIG. 1 which depicts the general construction of the invention, it will be noted that a foil supply 1 is indicated which may produce either a tubular foil to be later slitted and otherwise treated or may supply individual foils for two or three of the members which go to make up the invention, the foil from the supply going to a foil separation station 2 where the necessary foil configurations are produced, a first oil section 3, referred to as the channel-forming foil section, passing to a feed station 4 from which the foil is fed for further processing. This channel forming foil section 3 is cut from a tubular foil as will be described later herein with reference to FIGS. 2 and 3 but the sections can be separately extruded as shown in FIG. 4.

Another foil section 5 is used to cover the channel-forming foil section 3, and a third foil section 6, referred to as the waterway forming section, is disposed adjacent to the cover foil section 5.

From the channel foil feed station 4 the channel-forming foil section 3 passes through a pre-heating station 8 to the vacuum forming and heat joining station 9 in which the foil after being pre-heated is further heated and when in a sufficient ductile state passes over a vacuum drum having the channels formed therein so that the foil is vacuum formed at this locality and is in readiness for the next stage of production which is also carried out on the vacuum drum and which consists in joining it to the cover foil section which is fused to it in all areas excepting at the channels to form closure means for the channels. This will later herein be described with reference to FIGS. 2 and 4.

The cover foil section 5 and the waterway forming section 6 are fed from the cover and waterway feed station 10 to a cover foil punching station 11 in which a series of holes 11a are punched in the foil at appropriate locations.

The location of the hole or aperture 11a is governed by a control activated in association with the vacuum drum which automatically activates the punching station 11 when a selected part of each channel passes a given location.

In this way, the location of the aperture 11a with respect to the outlet 16f, controls the length of the tortuous pathway or restricted path that the water will have to travel in order to be released to atmosphere.

Self-evidently, the shorter this distance, more water will flow whereas the longer distance as is shown in FIG. 13, will achieve a maximum pressure reduction effect.

One of the features of being able to pack so much distance in a tape, is to ensure that the actual aperture size formed between the channel and the cover foil will be able to be reasonably large but providing an adequate pressure radiation.

One feature of importance is that the diameter of the aperture 11a should be such as to encompass at least several of the channels or more particularly the legs in the adjacent channels so that the specific location of the aperture will not have to coincide with one part of a channel precisely.

It is of little consequence that it strikes across two or three legs of a channel in that it will obviously allow the water to take the shortest path.

It is also self-evident that the aperture while being shown in dotted outline as round is not quite so round in practice. Accordingly, allowing for changes in shape of the hole means that the aperture size has to be this little bit larger.

These register with a respective channel when the cover foil section is passed through a pre-heating station 12 and then joins the channel forming foil section 3 on the vacuum forming drum where the joining takes place by fusion of the channel forming foil 3 and the cover foil 5, fusion taking place over the complete area excepting over the channels in the channel forming foil section 3. This is assisted however by a dimpling or knurling of a pressure roller as shown particularly in FIG. 13.

The waterway forming foil section 6 bypasses the area where the cover-forming foil 5 is punched as shown in FIG. 1 but rejoins the cover foil section 5 and passes over the drum as the outer foil section 6 and is not bonded to the cover foil section 5 but the three foil sections then passes to an edge fusing station 13 where the marginal edges of the second and third foil sections, that is the cover foil section 5 and the waterway forming foil section 6 are fused together.

From the edge fusing station 13 the tape now goes to the channel nicking station 14 shown particularly at FIGS. 10, 11 and 12 in which an offset end of each channel is nicked away by a heated blade 16.

This is achieved by using a flat fronted blade the typical outline being shown at 16a and the front edge 16b being located so as to ensnare the outlet part 16c of the channel.

The blade 16 is in the form of an electrode coupled between electrode connections 16d and 16e so that the temperature can be controlled through appropriate Thyrister control means by controlling the amount of current passing through the blade 16.

The temperature of course is governed by the extent to which there is needed to be a heating and melting effect of the selected plastics material.

Nonetheless, he point is that the outlet channel part 16c has a height that is substantially the same as the remaining channel and the outlet is offset to one side of the remaining channel in each of a series of channels so that the location of the blade 16 can be fixed and can therefore cut automatically by nicking and in fact pushing away the melted material as it passes over the outlet channel part 16c. From this station the tape goes to a trimming station 15 where the tape is completed.

Referring now particularly to FIGS. 2 and 3 which show the form of the invention when a tubular foil is processed to produce a tape.

The form of the foil is particularly shown at the various stations in FIG. 3 and it will be noted that at station A the foil is of tubular form, station B being the foil separation station at which the foil is cut to form two sections, the cut being made at about one third the distance in from one end of the folded foil and the two parts of the foil are then separated with the channel-forming foil 3 passing to the channel foil feed station 4 and from thence to the pre-heating station 8 from which it is taken to the vacuum forming and sealing station 9 where it passes around a rotating drum 20 on which it meets the other two foils namely the cover and waterway foils.

FIG. 3A shows the tubular foil and B shows the channel-forming foil 3 in its still folded position but with the doubled back portion adjacent to it forming the cover foil section 5 and the waterway foil section 6.

The channel-forming foil section 3 is opened out into a planar form before it reaches the feed station 4 where it is gripped between rollers 21 and driven forward and then passes through the pre-heating station 8 where both sides of the foil are raised in temperature, the pre-heated foil then passing around a roller 22 to be deposited on the drum 20 where it is further heated by the heating members 23 and is then carried to a heater 24 where its surface is brought to the required fusing temperature.

The foil sections 5 and 6 pass between a pair of rollers 25 and are then separated slightly so that the foil section 5 can be punched at appropriate localities in the cover foil punching station 11, and this foil is then pre-heated at 26 and together with the waterway forming foil 6 is laid onto the channel forming foil 3 by a pressure roller 27.

At this point the outer surface of the channel forming foil 3 and the outer surface of the cover foil 5, which is disposed at the back of the waterway forming foil, are fused together because the two surfaces have been raised to the required temperature but as the waterway forming foil 6 is on the outside of the laminate now positioned on the drum 20 it is not joined to the foil with which it is in contact.

The foil sections, as a laminate, then continue around with the drum 20 through a cooling zone 28, the drum 20 being water cooled and the drum preferably consisting of a series of tiles 29 which extend across the drum and which are themselves channelled with the channels communicating through apertures with the inside of the drum 20 which is held at reduced pressure so that the channel-forming foil section 3 is patterned by sections of it being drawn into the channels of the drum and immediately the cover foil section has been joined to it by fusion due to the heating of the two surfaces which are pressed together, cooling is applied to the area of the drum which then continues until the now partially completed tape is taken from the drum around a roller 30 at which is situated a nicking member 31 which notches out appropriate end portions of the channel to allow flow from the channels to the atmosphere.

From this the tape continues to the edge fusing station 13 where appropriate edges are fused together, which edging will be clear from FIGS. 5 and 6 which show a preferred form of construction, FIG. 5 showing how a single tape is formed, but FIG. 6 showing how a relatively wide compound tape can be formed which is then slitted in the trimming station 15 by cutting through the marginal areas of the tapes at the position indicated by 32 in FIG. 6.

Where such a compound tape is formed it will be realised that, referring to FIG. 3, the width of the tape sections 3, 5 and 6 are sufficient to cover the area of a compound tape but as stated the tapes can be formed as a multiple production system where a series of tapes are formed side by side and then split to form individual tapes.

Referring now more particularly to FIG. 4 in which similar numbers have been used for corresponding parts, the system involved there uses separate foils rather than sections of a wider foil which can either be preformed or can be extruded directly into the forming machine with the foil sections disposed preferably as shown in FIG. 6.

While features of the invention can be substantially varied some details regarding temperatures and mechanisms will now be referred to.

During manufacture of the tape the foil being a thermo-plastics material is fed through the driven rollers 21 in the feed station 4 and then both sides are heated to an even temperature by radiant heaters in the pre-heating station 8. It is preferably to feed through the driven rollers 21 so as to eliminate tension in the foil as it passes through the radiant heaters in the station 8 the temperature not being too high however to allow undue stretching under tension.

Foil surface temperatures, sensed by temperature sensing means, have proved that the correct temperature should be in the vicinity of 60° C. with the thermo-plastics materials normally used for these tapes, which temperature is preferably maintained by Thyrister control and electronic monitoring means.

After pre-heating, the foil passes round the roller 22 which is distant from the main drum 20 by the thickness of the foil and this roller 22, which is also heated, positions the channel-forming foil section correctly on the vacuum drum 20 without inducing unnecesary stress in the material, the roller 22 being maintained at a constant temperature of approximately 100° C. The tension on the foil section 3 can be accurately controlled by the rollers 21 and the rate of rotation of the drum 20.

The channel-forming foil section 3 is now heated externally from the drum over a relatively long circumferential section of the drum 20, which is also heated, so as to regulate the temperature of the foil by the radiant heater 23 to just above permanent deformation temperature, the internally exerted vacuum drawing the heated foil into the channels of the drum 20, and the temperature of the foil is then reduced below deformation temperature before leaving the embossed face of the drum, this being achieved by maintaining the drum 20 at about 50° C. through internal water cooling.

The tiles which form the drum 20 have a large number of vacuum transferring holes radially through the tiles which are connected by a series of cross holes to supply means through the hollow shaft of the drum 20 in any approved manner.

The cover foil section 5 and the waterway forming section 6 of the foil are heated to approximately 90° C. by radiant heaters 26 and come together with the channel-forming foil section 3 and at the point of meeting the mating faces of the foils 3 and 5 are elevated to above melt temperature by the radiant heaters 24, this heating occurring just prior to the two surfaces being pressed together between the drum 20 and the pressure roller 27 so that the two surfaces fuse together due to the pressure exerted by the drum 20 and roller 27 at all points excepting where the channels occur, this bonding taking place only between the channel-forming section 3 and the cover foil section 5, there being no bonding of the waterway forming section 6 to the cover foil section 5. Due to the rotation of the drum the relatively complete but not edge bonded sections of the foil laminate move around the drum 20 to the roller 30, the reason for the foil extending almost completely around the drum 20 being to form a vacuum seal so that the vacuum can be maintained within the drum.

The face of the drum 20 and/or the roller 22 is patterned to provide a multiplicity of small dimples on the foil section 3 for better bonding to the cover foil section 5.

The foil laminate now passes through the nicking station 14 to open to the atmosphere projecting the channels at appropriate locations such as at the edges, communication between the waterway and the channels having been provided by the apertures at the cover foil punching station 11.

The means for punching the cover foil section 5 comprise a drum 32 having punches 33 of somewhat conical shape on the surface which co-operate with a roller 34 having corresponding recesses 35, but the temperature of the punching members is maintained such that the material which is to be removed is at least partly vaporised and causes the material to shrink away from the centre of the perforation to provide an aperture of the required dimension, the drum 32 carrying the punches 33 being synchronised with the movement of the foil section 5 to ensure that when the cover foil registers with the channels in the channel-forming foil section 3 these apertures are correctly registered in relation to the part of each channel where ingress of water from the waterway is to occur.

From the nicking device 31 the foils pass through an edge sealing station 13 where radiant heater means, positioned on each side of the compound foil, direct sufficient heat to both sides of the tape along narrow lines to bond the edges of the cover foil section 5 of the tape to the waterway forming sections 6 of the tape to form as it were a hose opening to the channels so that flow can then take place through the channels in which flow is restricted to allow slow outflow from the ends of the channels where the material has been nicked away.

After so marginally bonding, the marginal edges of the tape are trimmed in the trimming station 15, this trimming being unnecessary in the case of the manufacture of a single length of tape but being essential where a series of such tapes are formed side by side from relatively wide foil sections as shown in FIG. 6. The marginal bonds between the cover foil section 5 and the waterway foil section 6 are designated 34.

With this invention the channel-forming section 3 of the tape is bonded to the cover foil section 5 of the tape over its complete width and no edge bonding of this occurs but the waterway is formed by bonding the extending edges of the wider cover foil section 5 of the tape to the marginal edges of the water foil 6, thus allowing the waterway to be of substantial width to feed a number of restrictor channels disposed along the finished tape and arranged in zig-zag fashion as shown but this form of channel is not necessarily essential as any relatively long channels with flow restrictor means in them can be used.

I claim:

1. A method of manufactured of drip irrigation tape comprising a plurality of longitudinally extending foil sections formed from thermo-plastic material and sealed to form a longitudinally extending main waterway and a plurality of tortuous flow restricting channels in communication with said main waterway, said main waterway having an inlet for receiving irrigation water and each of said channels having an outlet for discharging said irrigation water, said plurality of foils comprising first, second and third foils wherein said second and third foils form said waterway and said first and second foils form said channels, said method comprising;
   (a) preheating said first foil section,
   (b) introducing the preheated first foil section onto a rotating channel forming drum having impressed therein a series of channel shapes around the circumference of the drum and including apertures from the channel shape to vacuum applying means, said channel shapes forming said series of flow restricting channels,
   (c) subjecting the foil to further radiant heating to raise its temperature above a melt point when it is being supported by the surface of the drum,
   (d) effecting a drawing in to the channel shape of appropriate parts of the thus heated foil,
   (e) effecting a radiant heating of an outermost surface of the said first foil and an inner surface of said second foil as it is introduced onto the said first foil on the respective thermo-plastics material comprised in the respective foils, and then
   (f) effecting through a pressure roller, a joining pressure to join the said foils whereby to effect a closing over of the respective channel shapes in the first said foil,
   said method being further characterized in that said channels have outlet parts which are disposed closer to an edge of said first foil section than the remaining parts of said channels and wherein said outlets are formed by cutting said outlet parts with a heated blade positioned close to said outlet parts as said tape passes by, said cutting taking place subsequent to the tape being moved from the channel forming drum.

2. A method of manufacture of a drip irrigation tape as in claim 1 further characterised in that the pressure roller has a plurality of dimples around its circumference whereby to effect such pressure over spaced apart locations.

3. A method of manufacture of an irrigation tape as in claim 2 in which there are hole punching means effecting a punching of the said second foil prior to it being directed into adjoining relationship with said first foil.

4. A method of manufacture of an irrigation tape as in claim 3 further characterised in said hole punching means comprise a finger which is heated to a temperature above the melting temperature of the thermo-plastics material from which said second foil is formed.

5. A method of manufacture of a drip irrigation tape as in claim 4 further characterised in that the finger is located on the surface of a first drum and there is a second drum located on the opposite side of the tape with a correspondingly located aperture and there are means to effect synchronous rotation of the respective drums whereby to provide upon initiation coincident full turn rotation matching the speed of the tape passing between the said drum.

6. A method of manufacture of drip irrigation tape as in claim 5 in which the hole punching means is effected by means associated with the channel forming drum.

7. A method of manufacture of drip irrigation tape as in claim 1 further characterised in that the plurality of longitudinally extending foil sections are formed from a tubular extrusion of plastics material, said tubular extrusion being fed through a separating and re-forming station, to produce said first, second and third foils.

8. A method of manufacture of a drip irrigation tape as in claim 1 in which the tape forming the waterway which comprises the said second foil and said third foil are constituted as being the same integral part of a first extruded foil and in which subsequent to a first part of the second foil being adhered over all meeting areas to the said first foil, a remaining part of the said second foil is folded across so as to have a weld along the meeting edge providing thereby the main waterway.

9. A drip irrigation tape comprising a plurality of longitudinally extending foil sections which together define a longitudinally extending main waterway having an inlet for receiving irrigation water and a plurality of tortuous channels in communication with said main waterway, each of said channels having an outlet for discharge of irrigation water;

said plurality of foil sections including first, second and third foil sections which are joined together, at least said first section being formed of thermoplastic material, said second and third foil sections together forming said waterway and said first and second foil sections together forming said channels, said channels being formed in a portion of said first foil section, the remaining portion of said first foil section being fused to said second foil section to enclose said channels;

each of said channels comprising a plurality of interconnected legs which together define a flow restricting path for water, each of said channels further including an inlet and an outlet part which is remote from said inlet, said outlet being formed in said outlet part, said inlet being an aperture in said second foil section extending across several of said legs and providing communication between said channel and said waterway.

10. A drip irrigation tape as in claim 9 in which each tortuous channel has an outlet part which is offset to a side as compared to the remaining part of said tortuous channel, the outlet being formed by a cutting away of a portion of such outlet part.

11. A drip irrigation tape as in claim 9 in which each of said legs has a zig-zag configuration.

12. A drip irrigation tape as in claim 9 in which said legs extend transversely and said legs have ends which are longitudinally aligned and spaced from the edge of said first foil section and in which the outlet parts of said channels are offset to the side compared to the remaining parts of said channels.

13. A drip irrigation tape as in claim 9 in which all of said foil sections are formed of thermoplastic materials.

14. Apparatus for the manufacture of a drip irrigation tape comprising a plurality of longitudinally extending foil sections formed from thermoplastic material and sealed to form a longitudinally extending main waterway and a plurality of tortuous flow restricting channels in communication with said main waterway, said main waterway having an inlet for receiving irrigation water and each of said channels having and outlet for discharging irrigation water, said plurality of foils comprising first, second and third foils wherein said second and third foils form said waterway and said first and second foils form said channels, the said apparatus comprising, (a) a channel forming drum, said drum including a plurality of shapes for forming channels in said first foil, said channels shapes being impressed with an externally impressed peripheral shapes around the drum and a plurality of apertures providing for passage of air from within each channel shape to an internal vacuum applying means;

(b) means for supplying said first, second and third foils to said channel forming drum;

(c) preheating means for preheating at least said first and second foils before they are introduced onto said drum;

(d) heating means for heating said first foil as it passes over said drum to cause fusion and channel formation;

(e) means for applying said second and third foils to said drum after said channels have been formed in said first channel and for fusing said second foil to all portions of said foil except for the portion which forms said channels;

(f) cooling means for cooling parts of the periphery of channel forming drum;

(g) means for forming apertures in said second foil so as to provide communication between said waterway and said channels and (h) means for slitting said first foil in the vicinity of the outlet parts of said channels so as to provide outlets for said channels.

15. Apparatus for the manufacture of a drip irrigation tape as in claim 14 wherein each of said foils is comprised of thermo-plastics material and wherein said heating means for heating said foil as ti passes over said drum are radient heating means, said apparatus further including means to effect by application of a heated finger, apertures within said second foil, means to continuously monitor the temperature of any such applied radiant heating and to control this whereby to maintain a constant being effect of such radiant heating means, and a pressure applying roller having dimples around an external surface thereof whereby to effect pressure through spaced apart location effected by the dimples whereby to cause a joining together of a respective first and second foil in which the first foil has had formed therein a channel shape and being drawn into a channel shaped mould by vacuum applying means, and the second foil has been introduced against an external surface of this first foil.

16. Apparatus for the manufacture of drip irrigation tape as in claim 15 in which said means for slitting said first foil comprises an outlet nicking station which comprises a heated blade having a wide frontal part adapted to form an outlet opening in the outlet part of each channel.

17. Apparatus as in claim 14, in which each of said channels of said tape has an outlet part which includes said outlet said is offset to a side as compared to the remaining part of said channel, and said nicking station is positioned so as to slit said outlet part and thereby form said outlet without cutting the remaining part of said channel, said nicking station being located so that said tape passes by said nicking station after it has left said channel forming drum.

18. Apparatus for the manufacture of drip irrigation tape as in claim 14, further including an edge sealing station comprising radiant heater means for bonding the edges of said third foil section to said second foil section, said edge sealing station being located so that said tape passes said edge sealing station after it has passed said slitting station.

* * * * *